Jan. 1, 1957  W. C. VIZARD  2,775,829
BEADED WELTING
Filed July 5, 1952  2 Sheets-Sheet 1
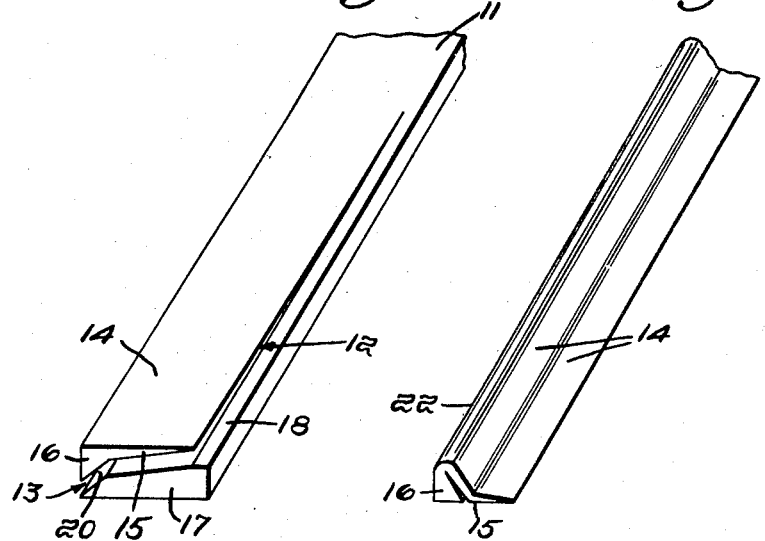
Inventor:
William C. Vizard,
by Thomson & Thomson
Attorneys

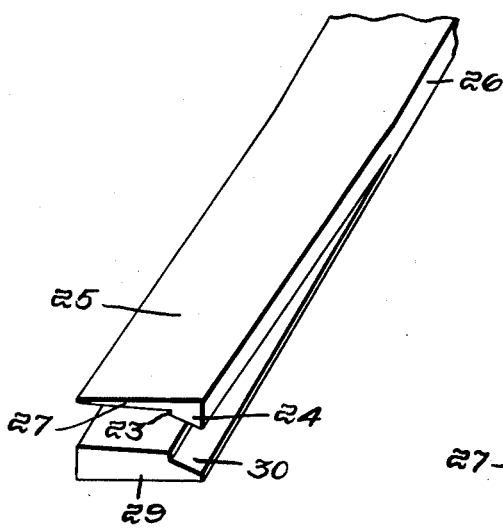
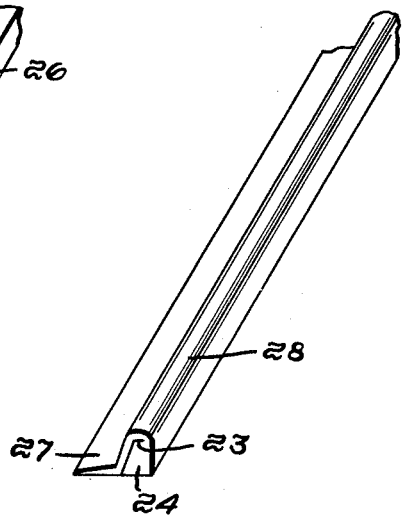
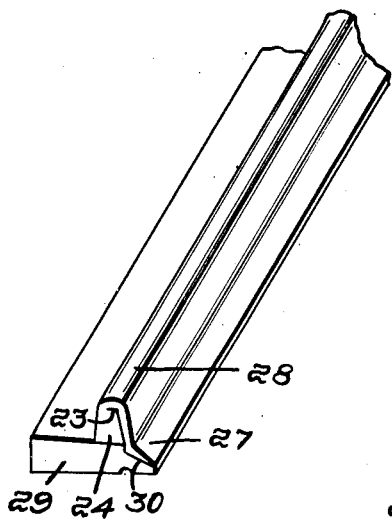
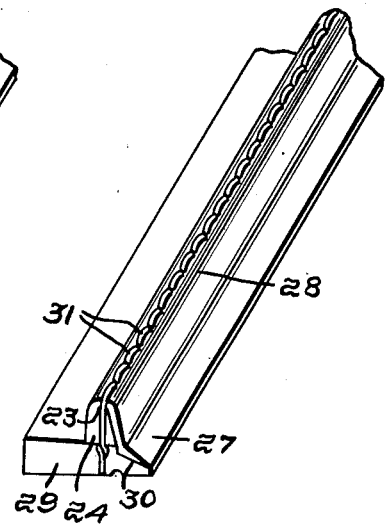

United States Patent Office

2,775,829
Patented Jan. 1, 1957

2,775,829

BEADED WELTING

William C. Vizard, Brockton, Mass., assignor to Barbour Welting Company, Brockton, Mass., a corporation of Massachusetts Application July 5, 1952, Serial No. 297,315

1 Claim. (Cl. 36—78)

This invention relates to the manufacture of leather shoe welting, and pertains more particularly to improvements in beaded welting.

The principal purpose of the invention is to provide an inexpensive beaded welt which is especially suitable for use as a workwelt, which is more economical to make than the welting described in my Patent No. 2,216,-506, dated October 1, 1940, and which provides a welt extension, bead and inseam flange all presenting upper surfaces of grain leather capable of taking a high polish to present a substantially uniform and attractive appearance in the finished shoe.

The improved welt is made from a fillet of standard Goodyear welting, one-half inch wide and one-eighth inch thick, by laterally slicing a relatively thin lip and a relatively thick bead core from the grain top of the fillet, to provide a top part which may be folded upon itself to form a bead, and a base part having a beveled inseam edge and a top grain extension along its opposite side; folding the lip against one side of the core to provide the folded bead; and cementing the folded bead upon the base part so that the grain lip overlies and strengthens the beveled inseam edge to which the margin of the lip is cemented.

Recommended embodiments of the invention are shown in the accompanying drawings which illustrate methods of making two forms of the improved welting, and in which:

Fig. 1 is a perspective view of a fillet partially divided by slicing cuts to form the bead part and the base part of the welt;

Fig. 2 is a perspective view of the bead part with the grain lip folded upon the flesh core thereof;

Fig. 3 is a perspective view of the welt base formed by the cuts of Fig. 1;

Fig. 4 is a similar view showing the bead cemented and molded to the base to provide a unitary beaded welt;

Fig. 5 is a view similar to Fig. 1, illustrating modified cuts of the fillet to form a bead part which has a wider top when folded upon itself;

Fig. 6 is a view similar to Fig. 2, showing the modified bead;

Fig. 7 is a view similar to Fig. 4, showing the bead of Fig. 6 cemented to the base part indicated in Fig. 5; and Fig. 8 shows the beaded welt of Fig. 7 with stitching running along the broad top of the bead and firmly securing the bead to the base.

In the form chosen for the purpose of illustration in Figs. 1 to 4, a fillet 11 of standard, half-inch Goodyear welting is laterally divided by an inclined cut 12, entering the grain surface along a line spaced approximately 1/16" inwardly of and parallel to one longitudinal edge of the fillet and continuing through the grain at a slight inclination beyond the longitudinal center of the fillet and preferably for a distance of approximately 5/16"; and by a steeply inclined cut 13 extending to the opposite longitudinal edge of the fillet at or adjacent the bottom thereof.

These cuts form a top part 14 having a grain surface and providing a relatively thin lip 15 and a relatively thick, triangular core 16 of flesh stock; and a base part 17 having a narrow, full grain margin 18, an inclined grain surface 19, and a beveled inseam edge 20 of flesh stock. An inseam groove 21 may be formed in the bottom of the base before or after the bead is cemented thereto.

The bead 22 is formed by folding and cementing the lip 15 onto the inclined surface of the triangular core 16, as indicated in Fig. 2, and the bottom of the bead is then cemented along the inner edge of the top grain surface 19 of the base 17, with the lip 15 cemented to its beveled inseam edge 20, to provide the inseam flange of the beaded welt which is pressed and molded to shape in a conventional manner.

The resulting product provides a sturdy and efficient welt having an upstanding bead of substantial thickness presenting a full grain surface; and the exposed upper surface 18 and 19 of the base or welt extension are also full or part grain and will receive a high polish corresponding to that applied to the bead. A durable and attractive beaded welt is thus made by a relatively simple and economical method, with a substantial saving of leather as compared with the welt of my aforesaid patent or other beaded welting heretofore produced.

The modified welt shown in Figs. 5 to 8 is manufactured essentially as above described but affords a bead with a broader and flatter top particularly adapted for receiving a row of stitching which ornaments the welting and additionally secures the bead to the welt base. In the welt of Fig. 4, the bead has a more pointed top, from which the point of an awl is likely to slip.

The width of the bead top is increased in the modified form by making a short vertical cut between the first and second inclined cuts, previously described, to form a shoulder 23 along the inner edge of the flesh core 24 of the top or bead part 25 of the divided fillet 26 (Fig. 5). When the lip 27 is folded and cemented onto the core 24 (Fig. 6), the shoulder 23 forms a shelf near the top of the bead 28, tending to flatten as well as broaden its top surface when the lip is folded onto said shoulder or shelf.

It will also be observed that the first slightly inclined cut which divides the filet 26, enters the grain at the extreme edge thereof, rather than inwardy of the edge, as in Fig. 1; and that the final, steeply inclined cut emerges from the opposite edge slightly above, but adjacent, the bottom of the welt base 29. These variations afford a somewhat wider bead lip 27 which will fully cover the beveled edge 30 of the base when the bead is cemented and molded to the base as shown in Fig. 7, in the manner previously described in connection with Fig. 4.

It will be understood that the welt of Fig. 7 may be used with or without the stitching 31 which is shown in Fig. 8; and that the modified form of beaded welting presents grain surfaces on the bead and on the welt extension, and possesses the other advantages ascribed to the welt of Figs. 1 to 4.

I claim:

A beaded shoe welting comprising a base portion, an upstanding bead, and an inseam flange, said base portion having an outer perpendicular marginal edge and an upper surface of grain leather extending from said marginal edge to the base of said upstanding bead, said upper surface having a portion inclined downwardly to the base of said upstanding bead, said inseam flange extending outwardly and downwardly from said upstanding bead, and the surface of said upstanding bead and of said inseam flange being continuous and of grain leather.

References Cited in the file of this patent

UNITED STATES PATENTS

| | | |
|---|---|---|
| 1,597,874 | Arnold | Aug. 31, 1926 |
| 1,687,461 | Lyon | Oct. 9, 1928 |
| 1,828,728 | Arnold et al. | Oct. 27, 1931 |
| 1,961,345 | Fallon | June 5, 1934 |
| 2,142,228 | Vizard | Jan. 3, 1939 |
| 2,153,321 | Vizard | Apr. 4, 1939 |
| 2,216,506 | Vizard | Oct. 1, 1940 |
| 2,299,263 | Vizard | Oct. 20, 1942 |
| 2,414,249 | Vizard | Jan. 14, 1947 |